United States Patent [19]
Hehl

[11] Patent Number: 5,547,366
[45] Date of Patent: Aug. 20, 1996

[54] MOLD CLOSING UNIT FOR USE IN AN INJECTION MOLDING MACHINE FOR PROCESSING SYNTHETIC MATERIALS

[76] Inventor: Karl Hehl, Arthur-Hehl-Str. 32, D-72290 Lossburg, Germany

[21] Appl. No.: 351,116

[22] Filed: Nov. 30, 1994

[30] Foreign Application Priority Data

Nov. 30, 1993 [DE] Germany .................. 43 40 693.9

[51] Int. Cl.⁶ ...................................... B29C 45/64
[52] U.S. Cl. ............................. 425/589; 425/595
[58] Field of Search ..................... 425/589, 590, 425/595

[56] References Cited

U.S. PATENT DOCUMENTS

| | | | |
|---|---|---|---|
| 4,380,427 | 4/1983 | Hehl | 425/590 |
| 4,846,664 | 7/1989 | Hehl | 425/589 |
| 5,052,910 | 10/1991 | Hehl | 425/589 |

FOREIGN PATENT DOCUMENTS 0281329  9/1988  European Pat. Off. ..
0342235  11/1989  European Pat. Off. ..
0554662  8/1993  European Pat. Off. ..

OTHER PUBLICATIONS

Patent Abstracts of Japan, vol. 18, No. 317 (M–1622), Jun. 16, 1994 & JP6071711, Mar. 15, 1994.

Patent Abstracts of Japan, vol. 16, No. 335 (M–1283), Jul. 21, 1992 & JP4097814, Mar. 30, 1992.

*Primary Examiner*—Tim Heitbrink
*Attorney, Agent, or Firm*—Spencer & Frank

[57] ABSTRACT

In a mold closing unit for use in an injection molding machine for processing synthetic materials a stationary mold carrier and a movable mold carrier are provided. A pressure cylinder comprising a pressure piston serves for building up the locking pressure and at least one piston-cylinder-unit serves for moving the movable mold carrier. The drive piston or drive cylinder are interconnected with the pressure cylinder. The pressure cylinder and the movable mold carrier constitute a motion unit displaceable relative to the stationarily mounted pressure pistons.

9 Claims, 6 Drawing Sheets

MOLD CLOSING UNIT FOR USE IN AN INJECTION MOLDING MACHINE FOR PROCESSING SYNTHETIC MATERIALS

CROSSREFERENCE TO RELATED APPLICATION

U.S. patent application Ser. No. 08/317,555 filed on Oct. 4, 1994 discloses related subject matter and is incorporated herein by reference.

BACKGROUND OF THE INVENTION

1. Field of the Invention

This invention relates to a mold closing unit for use in an injection molding machine for processing synthetic materials comprising a stationary mold carrier, a movable mold carrier constituting a mold tentering space together with the stationary mold carrier between the movable mold carrier and the stationary mold carrier, at least one pressure cylinder comprising a pressure piston adapted to build up the locking pressure, at least one piston-cylinder-unit adapted to transfer the movable mold carrier into and out of a closed position with the stationary mold carrier for closing parts of a mold within the mold tentering space; a drive piston or a drive cylinder, respectively, of the piston-cylinder-unit and the pressure cylinder are interconnected.

2. Description of the Prior Art

A mold closing unit of this kind is known from U.S. Pat. No. 4,846,664. In this unit a movable mold carrier is connected with a pressure piston of a pressure cylinder and pistons of compensating cylinders. The pressure cylinder and the compensating cylinders are closed by common cylinder covers, which receive steel bushings between them. A drive cylinder is arranged coaxially with respect to the pressure cylinder. The movable mold carrier must be made of a relatively strong plate resistant to bending, due to the small diameter of the piston rods in the contact area between the movable mold carrier and the pistons rods. Since the piston rods constitute the only connection to the remaining mold closing unit, mold parallelism could not be granted without reinforcing at least the supporting surface of the movable mold carrier. In this unit space is indeed saved by the coaxial arrangement of the drive cylinder and the pressure cylinder, however, not all requirements with regard to a compact construction can be entirely met, since the drive cylinder is placed in the axis of the mold closing unit, where basically an ejection unit should also be arranged. Finally the hydraulic supply lines must be partially flexible, in order to make possible a supply of all cylinder chambers.

U.S. Pat. No. 5,052,910 discloses a mold closing unit in which two pressure cylinders are arranged symmetrically with respect to the symmetry axis of the mold closing unit. The driving cylinder, the ejection unit and the compensating cylinder are arranged coaxially to this axis. In this mold closing unit building-up of higher forces is achieved, however, a compact construction of the mold closing unit is still not possible due to the centrical arrangement of the drive cylinder and the thus obligatory series connection of the drive cylinder and the ejection unit. Also in this arrangement the mold carrier cannot be supported by the mold closing unit itself, since merely the pressure pistons and the cylinder of the driving cylinder are connected with the movable mold carrier. Consequently it is also indispensable to use flexible lines.

Further comparable mold closing units are known from European Published Patent Applications 281 329 A2, 342 235 A1 and U.S. Pat. No. 4,380,427. In all these units, however, like in the others already mentioned, the pressure piston is in connection with the movable mold carrier, which makes necessary an additional reinforcement of the movable mold carrier.

SUMMARY OF THE INVENTION

It is an object of the invention so to design a mold closing unit for use in an injection molding machine for processing synthetic materials, in that a compact construction of the mold closing unit can be realized and at the same time the movable mold carrier meets the requirements made.

That object is accomplished in accordance with the invention in that the pressure piston is stationarily arranged at the stationary mold carrier and, the pressure cylinder and the movable mold carrier constitute a motion unit, which is displaceable relative to the pressure piston.

In contrast to the mold closing units known, in this arrangement it is not the pressure piston that is moved but the pressure cylinder. As a result of the larger diameter of the pressure cylinder on the one hand the mold carrying plate is supported by a bigger surface, so that only therefore a reduction of the thickness of the movable mold carrier is possible. The larger diameter of the cylinder in contrast to the piston makes also possible that the motion unit 'movable mold carrier-pressure cylinder' is supported at the pressure piston, so that a kind of box plate is formed, wherein the box is also created by and includes the pressure cylinder. The additional support made possible that way permits a further reduction of the expenditure with regard to the movable mold carrier, which becomes especially apparent in positive sense, if the movable mold carrier is made of burning blanks.

Thus for the first time a motion unit is created, which assumes the function of hydraulic drive and movable mold carrier at the same time. Since the movable mold carrier must not be reinforced additionally, its size in closing direction can be shortened. Therefore the disadvantage resulting from the increase of the masses now to be moved due to the reversion of the principle known is willingly accepted. The reversion of the principle known also creates the constructional conditions for the exclusive use of rigid lines for supplying the cylinder chambers with hydraulic fluid, making possible as a consequence a more precise adjustment of the mold closing unit.

DETAILED DESCRIPTION OF THE PREFERRED EMBODIMENTS

The invention will now be described in more detail by example with reference to the embodiments shown in the Figures. It should be kept in mind that the following described embodiments are only presented by way of example and should not necessarily be construed as limiting the inventive concept to any particular physical configuration.

Figure 1:
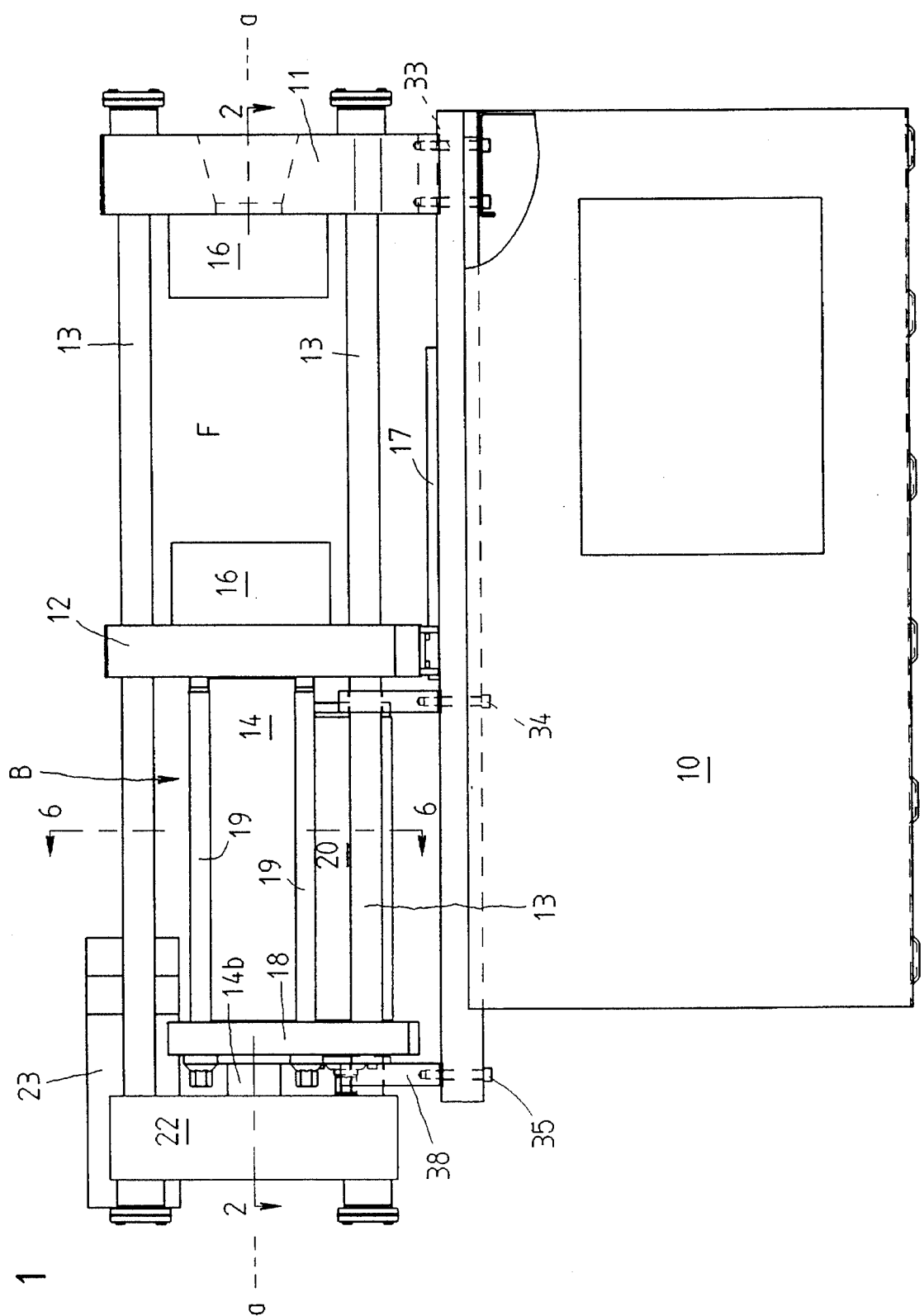
FIG. 1 is a side view of the mold closing unit on a machine base.
Figure 2:
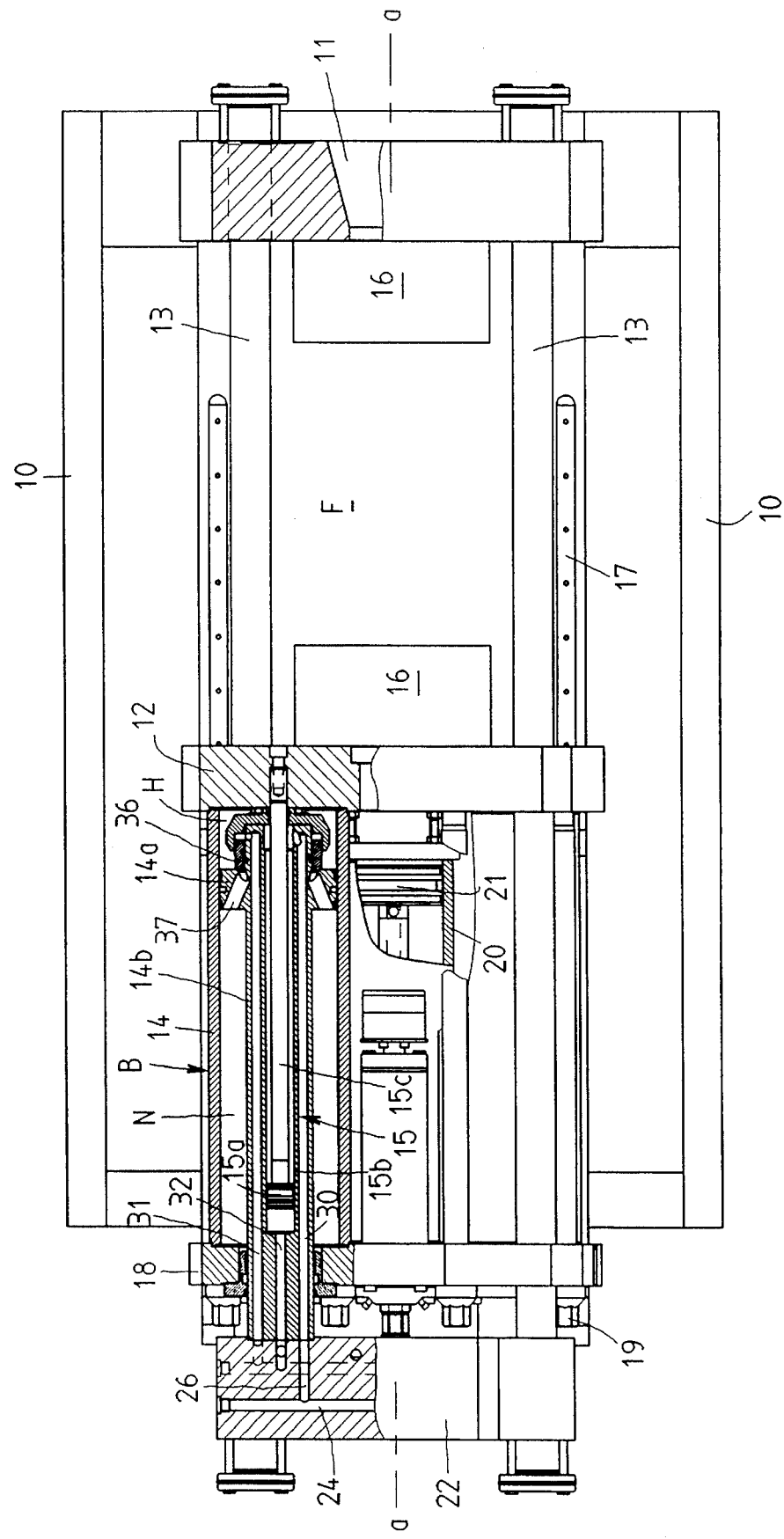
FIG. 2 is a horizontal section through the open mold closing unit according to FIG. 1 at height of the axis a—a.
Figure 3:
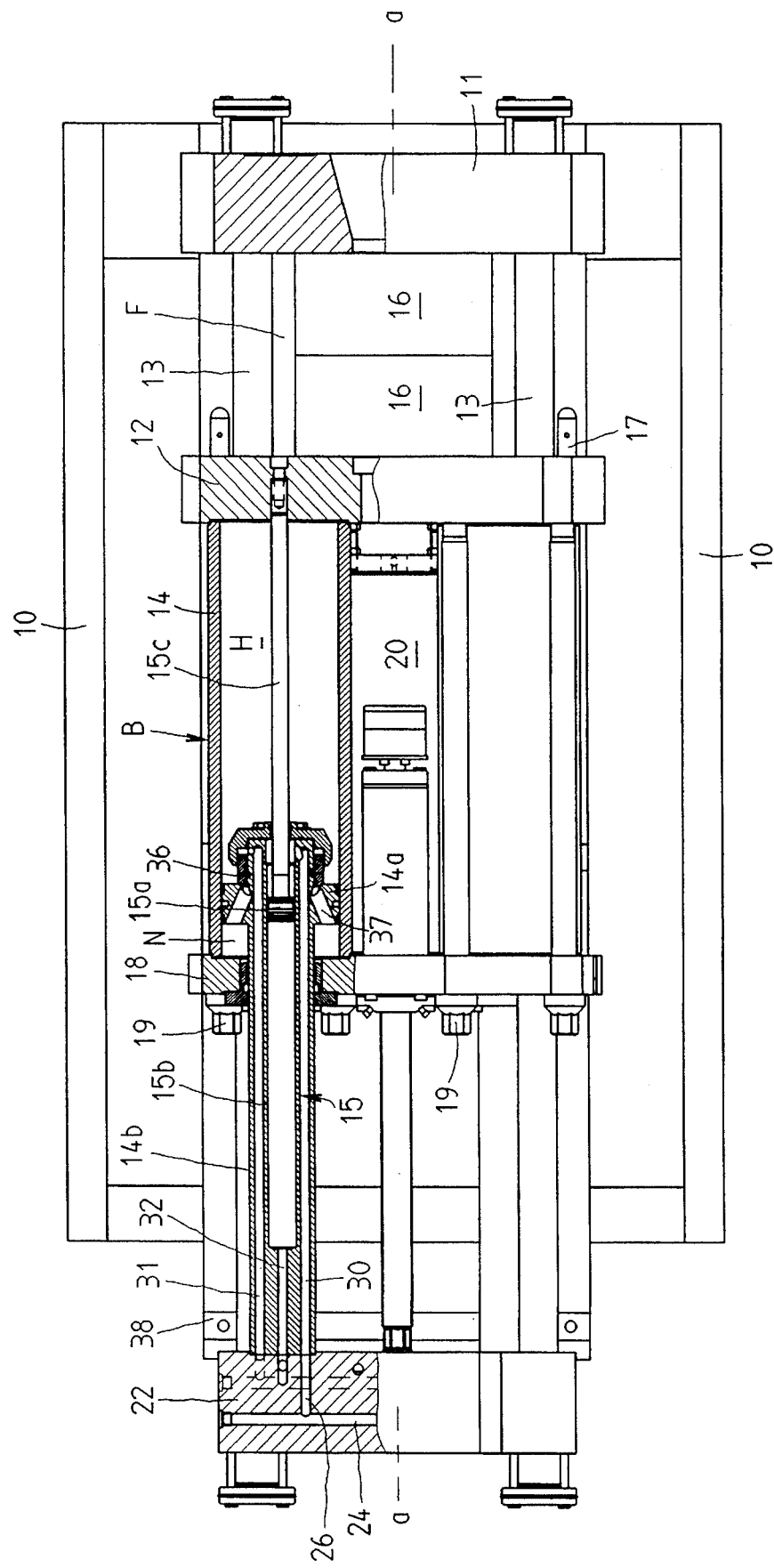
FIG. 3 is a representation according to FIG. 2 when the mold is closed.

According to FIG. 1 the mold closing unit is mounted on a machine base 10. The mold closing unit comprises a stationary mold carrier 11, a movable mold carrier 12, as well as a plate 22, which are connected with the machine base 10 by fixing means 33, 34 and 35. The plate 22, the movable mold carrier 12 and the stationary mold carrier 11 are penetrated by rods 13, which take up the forces summoned-up by the mold closing unit. The rods 13 are mounted in the stationary mold carrier 11 and the plate 22 and serve as guides for the movable mold carrier 12 as the latter slides thereon between an open mold position (FIG. 1) and a closed mold position (FIG. 3). It is, of course, also possible to use models without spars or rods. The movable mold carrier and the stationary mold carrier constitute a mold tentering space F between them, in which parts of a mold 16 can be arranged. The mold 16 is supplied with plastifiable materials such like synthetics, powdered material or ceramic material by an injection molding unit, which is not represented graphically.

The mold closing unit is provided with at least one, in the present embodiment with two pressure cylinders 14 and their corresponding pressure pistons 14a for building up the locking pressure. A piston-cylinder-unit 15 is provided for transfering the movable mold carrier 12 into and out of a closed position with regard to the stationary mold carrier 11 thereby closing the parts of the mold 16 in the mold tentering space F. The drive pistons 15a or the drive cylinders 15b, if drive piston and drive cylinder are reversed in function, of this piston-cylinder-unit 15 and the pressure cylinder 14 are interconnected via the movable mold carrier 12. A motion unit, displaceable relative to the stationarily mounted pressure pistons 14a, is constituted by at least the pressure cylinder 14 and the movable mold carrier 12. So far the movable mold carrier 12 is not only movably carried on the guideway 17, but also at the piston rods 14b of the pressure cylinder 14. The large-surface support permit to fabricate the movable mold carrier in a flat form and as burning blank.

The motion unit B, however, not only comprises the pressure cylinder 14 and the movable mold carrier 12, but also the drive pistons 15a of the piston-cylinder-unit 15 and the cylinder cover 18 of the pressure cylinders 14. In the present embodiment the two pressure cylinders 14 surround the piston-cylinder-unit 15 coaxially. Actually the piston rod 14b of the pressure cylinder is at the same time the drive cylinder 15b of the piston-cylinder-unit 15. The pressure cylinder 14 as well as the compensating cylinder 20 consist of each one steel bushing, which are closed by the cylinder cover 18 and the movable mold carrier 12 to constitute a cylinder chamber. The pulling bolts 19 assume the function of a tension rod and tenter the cylinder cover 18, the steel bushings and the movable mold carrier 12 together, so that they constitute a rigid motion unit B. Another advantage offered by this arrangement is that the dimensions of the movable mold carrier 12 can be further reduced. This compact construction type is not influenced by possible irregular piston operation of different cylinders, which increases life of the mold closing unit and the molds.

Figure 5:
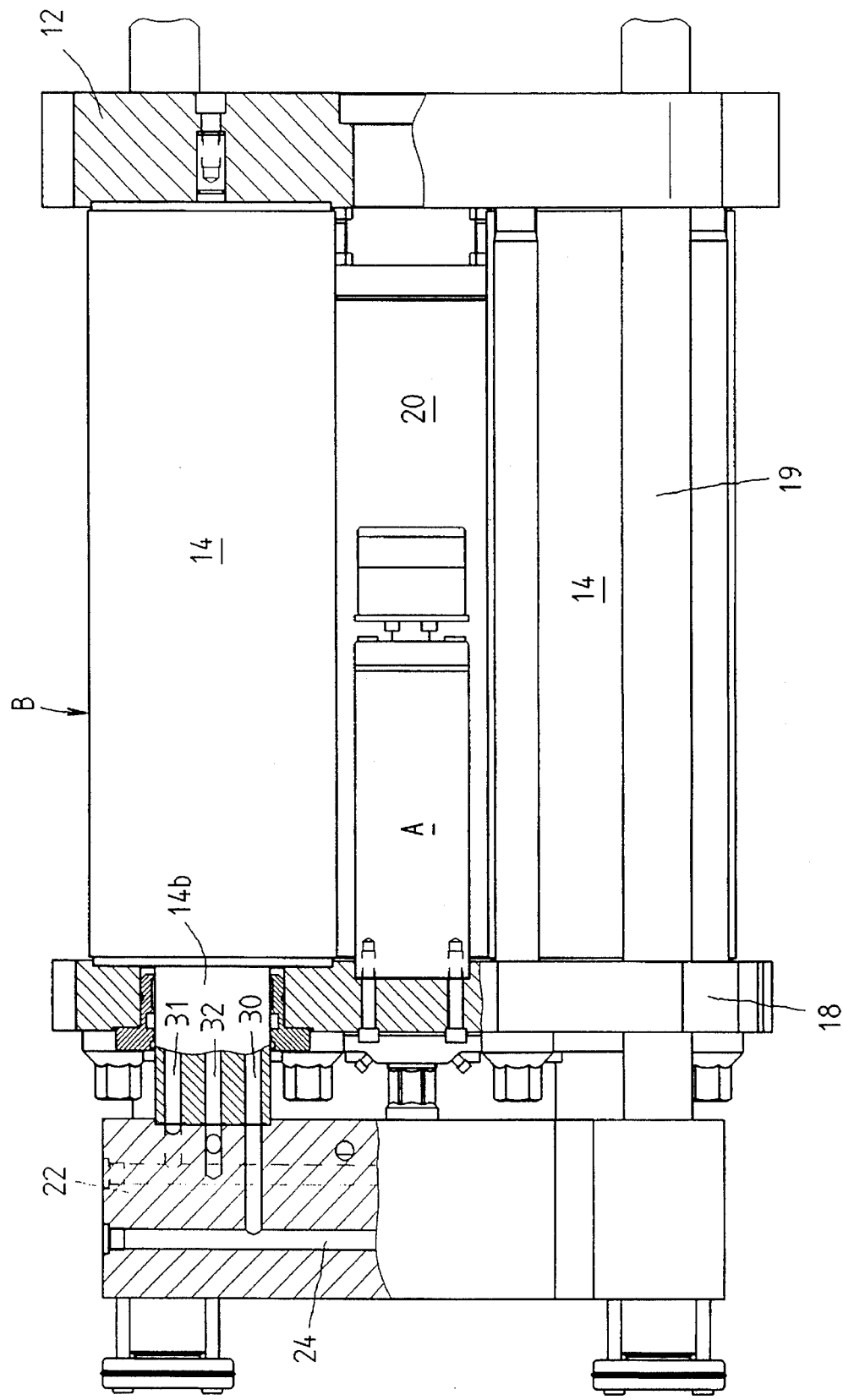
FIG. 5 is a partially cutted top view in the area of the motion unit according to FIG. 4.
Figure 6:
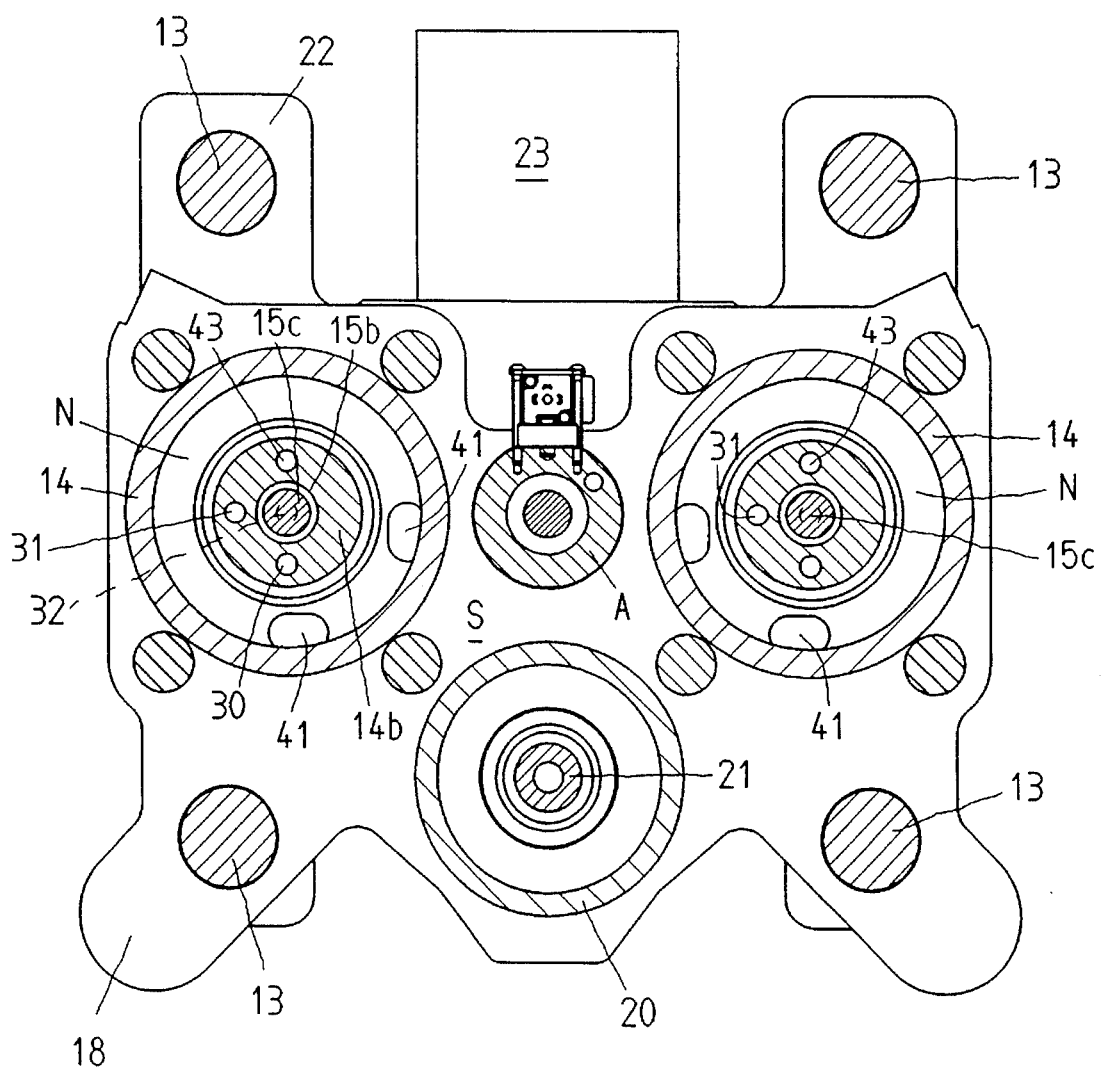
FIG. 6 is a sectional view according to line 6—6 of FIG. 5.

The pressure cylinders 14 arranged symmetrically with respect to the axis a-a of the mold closing unit and at least one compensating cylinder 20 are placed in such a way around the axis a—a that between them they constitute a centrical free space S, according to FIGS. 5 and 6. This free space serves for mounting further elements, which are preferably arranged in the axis a—a. In this embodiment an ejection unit A is arranged between the pressure cylinders 14. The centrical arrangement permits the use of rotary means in case for example threaded inserts are to be manufactured. Besides, the free space S makes possible a shortening of the whole mold closing unit, since a series connection of the ejection unit and the drive cylinder is not necessary any more.

Figure 4:
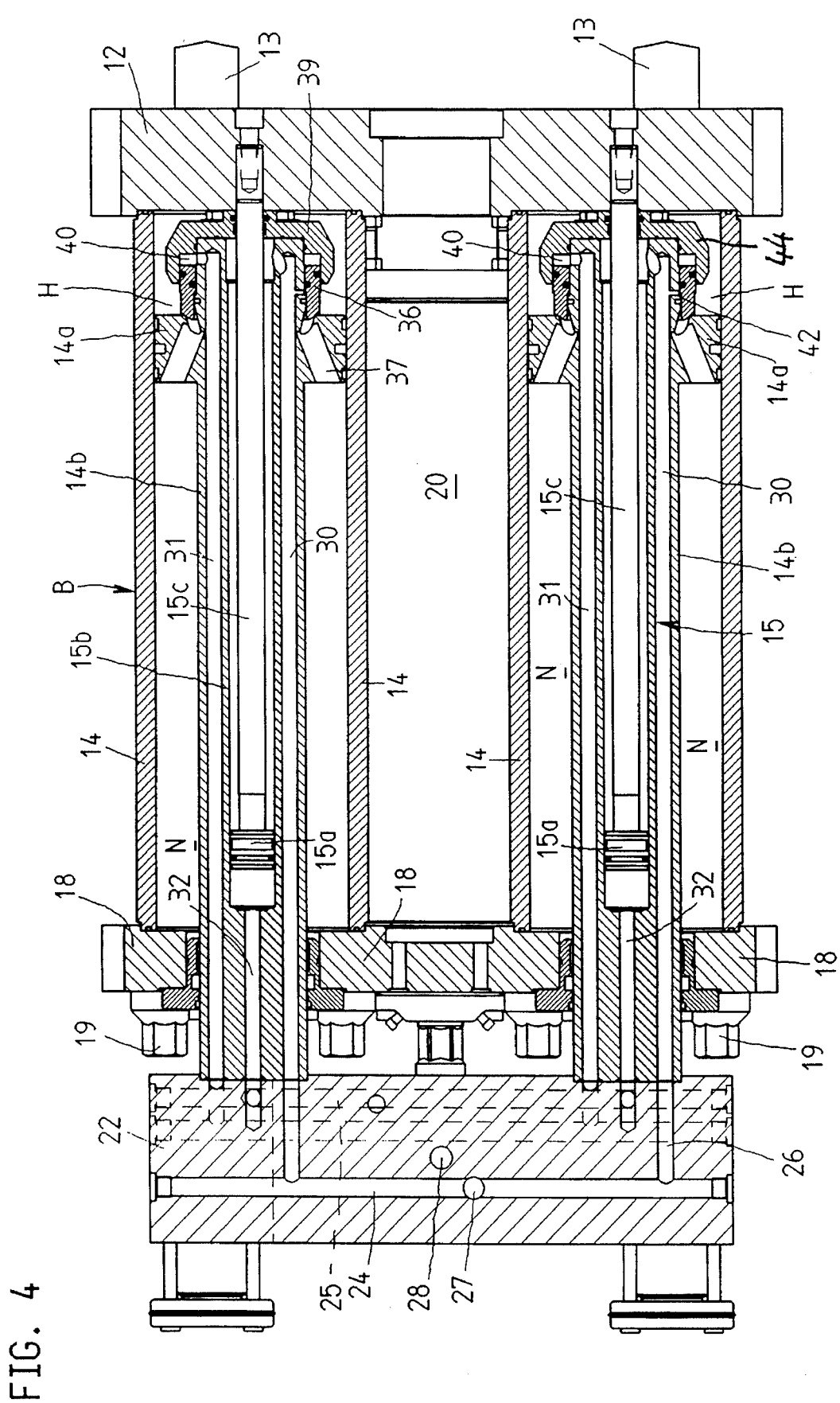
FIG. 4 is an enlarged clipping in the area of the motion unit according to FIG. 2.

The plate 22 is supported at the machine base 10 by supporting elements 38. The plate 22 carries the hydraulic block 23 assigned to the mold closing unit, so that all movements of the mold closing unit can be influenced by that part. The plate 22 itself serves as distributing means for the hydraulic fluid, as is especially apparent from FIG. 4. The hydraulic fluid initially flows via bore holes 24, 25, 26 and 27 in the distributing means to axial bore holes 30, 31, 32 in the piston rod 14b of the pressure piston 14a, so that a centrical position of the hydraulic block is given without having to conduct flexible lines to the individual consumers.

Inside the pressure cylinder itself the pressure piston 14a separates a high-pressure chamber H from a low-pressure chamber N. The low-pressure chamber is in open connection with the compensating cylinder 20 via the second transfer passages 41. The compensating cylinder 20 is also connected with the motion unit B and is provided with a stationarily mounted compensating piston 21. If hydraulic fluid is ousted from the high-pressure chamber, the oil first of all flows into the low-pressure chamber N via the first transfer passages 37 of the pressure piston 14a and the quantity that cannot be taken up by the low-pressure chamber anymore runs then into the compensating cylinder 20, which according to FIG. 6 is arranged under the axis a-a and under the ejection unit A. If required, the first transfer passage 37 can be closed by an annular piston 36, which is actively controllable into and out of a closing position. For this purpose a cover element 44 (FIG. 4) is arranged at the end of the pressure piston 14a, whereby a first cylinder chamber 40 is provided between the annular piston 36 and the cover element 44. Besides, a second cylinder chamber 42 is provided for the purpose to actively open the annular piston 36. The axial bore hole 30, which supplies the drive cylinder D with hydraulic fluid is in open connection with the second cylinder chamber 42, so that the annular piston 36 is opened automatically when the mold closing unit is moved. This process is explained in detail in German Patent Application P 43 35 006, to which is herewith referred.

It should be pointed out that to simplify matters the bore holes 30, 31 and 32 are represented in the sectional views of the FIGS. 2–5 in one plane, although basically they are arranged according to FIG. 6.

The operating method of the device is as follows:

Hydraulic fluid is led into the axial bore holes 32 via the bore hole 25 in order to close the injection mold. The hydraulic medium runs against the drive piston 15a, which consequently, as can be seen in the Figures, moves to the right side. The volume of the opposite arranged cylinder chamber is reduced by this movement and the hydraulic fluid is drained via the axial bore hole 30, the bore holes 26, 24 and 27 in the plate 22. The pressure resulting from this operation leads also to an admission of the second cylinder chamber 42 and thus the first tranfer passage 37 in the pressure piston 14a is reliably opened. Since the drive piston 15a is connected with the movable mold carrier 12 by the piston rod 15c, on one hand, and the pulling bolts 19, the cylinder cover 18 and the pressure cylinder 14 on the other hand with the movable mold carrier, this movement leads to a reduction of the low-pressure chamber N and to an increase of the high-pressure chamber H.

When the mold closing unit is in a position as shown in FIG. 3, the locking pressure can be summoned-up by the axial bore holes 43 (FIG. 6). Previously, however, the cylinder chamber 40 is entered by hydraulic fluid via the bore hole 28 and the axial bore hole 31 and the first transfer passage 37 is closed by the movement of the annular piston 36.

For the opening process hydraulic fluid is supplied via the bore holes 24 and 26 as well as the axial bore hole 30 of the piston-cylinder-unit 15, by which a movement of the drive piston 15a to the left is generated, as can be seen in FIG. 3. The second cylinder chamber 42 is opened by supply of the axial bore hole 30 with hydraulic fluid, so that also the first transfer passage 37 is in an open position. If the motion unit B moves to the left, the low-pressure chamber N is increased and the high-pressure chamber H reduced. At the same time hydraulic fluid gets to the compensating cylinder 20 via the second transfer passages 41.

We claim:

1. In a mold closing unit for use in an injection molding machine for processing synthetic materials, including a stationary mold carrier, a movable mold carrier constituting a mold tentering space together with said stationary mold carrier between said movable mold carrier and said stationary mold carrier, pressure cylinder, a pressure piston located inside said pressure cylinder to build up a locking pressure, a piston-cylinder-unit for transferring the movable mold carrier into and out of a closed position with said stationary mold carrier for closing parts of a mold within said mold tentering chamber; said piston-cylinder-unit having a drive piston and a drive cylinder; one of said drive piston and said drive cylinder of said piston-cylinder-unit being interconnected with said pressure cylinder, the improvement wherein said pressure piston is stationary with respect to said stationary mold carrier and said pressure cylinder and said movable mold carrier constitute a motion unit displaceable relative to said pressure piston.

2. The mold closing unit set forth in claim 1, wherein said movable mold carrier is movably mounted on a guideway and on a piston rod of said pressure piston.

3. The mold closing unit set forth in claim 1, wherein said drive piston, said pressure cylinder with a cylinder cover and said movable mold carrier constitute said motion unit wherein said pressure cylinder coaxially surrounds said drive cylinder.

4. The mold closing unit set forth in claim 1, wherein said pressure cylinder at a first end is closed by a cylinder cover and at a second, opposite end by said movable mold carrier; said cylinder cover being fixed at said movable mold carrier via pulling bolts.

5. The mold closing unit set forth in claim 1, wherein said pressure piston of said pressure cylinder separates a high-pressure chamber from a low-pressure chamber, said low-pressure chamber being in open connection with a compensating cylinder provided with a compensating piston and connected with said motion unit.

6. The mold closing unit set forth in claim 1, wherein two pressure cylinders arranged symmetrically with respect to an axis of said mold closing unit and at least one compensating cylinder are arranged around said axis and are constituting a free space between said pressure cylinders and said compensating cylinder for arrangement of further elements in the axis.

7. The mold closing unit set forth in claim 6, wherein an ejection unit linked with said motion unit is arranged between said pressure cylinders.

8. The mold closing unit set forth in claim 1, wherein said pressure piston is fixedly connected with a plate which occludes said mold closing unit and carries a hydraulic block for said mold closing unit.

9. The mold closing unit set forth in claim 8, wherein said plate is provided with several bore holes for distribution of hydraulic fluid, which run into axial bore holes of a piston rod of said pressure piston.

* * * * *